United States Patent [19]
Wang

[11] Patent Number: 5,563,399
[45] Date of Patent: Oct. 8, 1996

[54] BAR CODE DECODING WITH DYNAMICALLY LOADABLE DATA CHARACTER SETS

[75] Inventor: Ynjiun P. Wang, Fort Myers, Fla.

[73] Assignee: Metanetics Corporation, Fort Myers, Fla.

[21] Appl. No.: 537,459

[22] Filed: Oct. 2, 1995

Related U.S. Application Data

[63] Continuation of Ser. No. 306,690, Sep. 15, 1994, Pat. No. 5,455,414.

[51] Int. Cl.[6] ....................... G06K 7/10
[52] U.S. Cl. .................. 235/462; 235/463
[58] Field of Search .................. 235/462, 463

[56] References Cited

U.S. PATENT DOCUMENTS 5,455,414  10/1995  Wang ........................... 235/462

*Primary Examiner*—Harold Pitts
*Attorney, Agent, or Firm*—Kenneth P. Robinson

[57] ABSTRACT

The reading and decoding of two-dimensional bar codes and other dataforms are simplified and field loading of different data character sets is enabled. Dynamic loading of new data character sets fully or partially superseding a factory installed default character set correlation listing is enabled by use of loadable correlation listings keyed to foreign language characters, symbols, words or phrases relevant to particular applications. The loadable correlation listings can be encoded into a two-dimensional bar code and loaded via a reading of the bar code by the bar code reader. Two or more correlation listings may be loaded into a bar code reader, with one of the correlation listings selected for decoding a particular bar code.

15 Claims, 4 Drawing Sheets

| A | B | C |
|---|---|---|
| DECODED VALUE | DEFAULT CORRELATION LISTING | LOADABLE CORRELATION LISTING |
| 0 | 0 | |
| 1 | 1 | |
| 2 | 2 | |
| 3 | 3 | |
| 10 | A | α |
| 11 | B | β |
| 12 | C | Δ |
| 1022 | | THE |
| 1023 | | ELECTRON |

T$_{seq}$  7, 5, 4, 3, 2, 3, 3

| T-SEQUENCE | DECODED VALUE |
|---|---|
| 7, 5, 4, 3, 2, 3, 3 | 0 |
| | 1 |
| | 2 |
| | 1021 |
| | 1022 |
| | 1023 |

| f(T) | Tseq | POINTER | DECODED VALUE |
|---|---|---|---|
| 1 | | — | 0 |
| 2 | | — | 1 |
| 3 | | 2027 | 2 |
| 5 | | 3 | 3 |
| 2027 | | — | 1021 |
| 2154 | | — | 1022 |
| 2167 | | 2154 | 1023 |

| f(T) | DECODED VALUE |
|---|---|
| 0 | SAME AS |
| 1 | f(T) |
| 1021 | |
| 1023 | |
| 1025 | 4 |
| 1067 | 20 |
| 1068 | 75 |
| 1080 | 1022 |

| A | B | C |
|---|---|---|
| DECODED VALUE | DEFAULT CORRELATION LISTING | LOADABLE CORRELATION LISTING |
| 0 | 0 | |
| 1 | 1 | |
| 2 | 2 | |
| 3 | 3 | |
| ... | ... | ... |
| 10 | A | $\alpha$ |
| 11 | B | $\beta$ |
| 12 | C | $\Delta$ |
| ... | ... | ... |
| 1022 | | THE |
| 1023 | | ELECTRON |

BAR CODE DECODING WITH DYNAMICALLY LOADABLE DATA CHARACTER SETS

This is a continuation of U.S. patent application Ser. No. 08/306,690 filed Sep. 15, 1994, which is to issue as U.S. Pat. No. 5,455,414, dated Oct. 3, 1995.

This invention relates to bar code decoding and, more particularly, to decoding methods utilizing dynamically loadable data character sets, enabling selection between different loadable data character sets, or both.

BACKGROUND OF THE INVENTION

The above-referenced application describes methods of decoding 2-D bar codes by use of dynamically loadable correlation listings which correlate decoded bar/space patterns to corresponding data characters. The present application is directed to the previously described dynamically loadable correlation listing methods, particularly in the context of 2-D bar codes and dataforms. While the term "2-D bar code" is commonly used as a generic term for all types of two-dimensional machine readable images, the term "dataform" may be more descriptive. As known in the art, the term dataform is used to generally describe machine readable images, including 2-D bar codes, which represent data encoded by combinations of low and high reflectivity bars and spaces. Reading and decoding of other types of dataforms, such as matrix codes, are well known and the present invention is directly applicable thereto.

BACKGROUND OF THE INVENTION

The use and decoding of one-dimensional bar codes are well known and such decoding may be accomplished relatively simply. Various forms of two-dimensional (2-D) bar codes are also known. One form of 2-D bar code designated PDF417 is described in detail in the "PDF417 Specification" authored by the present inventor, which was published in 1991. The encoding and decoding of 2-D bar codes in formats such as PDF417 are addressed at length in U.S. Pat. No. 5,243,655, granted to the present inventor on Sep. 7, 1993. As a result of the availability of these and other documents, persons skilled in this field have a relatively high level of information regarding both the encoding and decoding of 2-D bar codes. An improved form of 2-D bar code, the packet bar code, and the encoding and decoding thereof are disclosed in the present inventor's pending U.S. patent application Ser. No. 08/280,490, filed Jul. 26, 1994, the content of which is hereby incorporated by reference herein.

Typically, a 2-D bar code includes, in one form or another, a plurality of bar/space patterns, each of which represents an encoded value or data character. For example, in the application referenced above each such bar/space pattern comprises a packet consisting of a 16, 4, 5 bar code. That form of identification is representative of a group of 4 bars and 4 spaces, beginning with a bar, that is a total of 16 modules wide, with each bar and space not exceeding a width of 5 modules. FIG. 1 shows an example of such a bar code which includes 4 bars respectively 4, 2, 1 and 2 modules wide and four spaces respectively 3, 2, 1 and 1 module wide. For this purpose, a "module" is a minimum unit of width.

The FIG. 1 bar/space pattern may be considered by use of different approaches. For example, an X-sequence approach considers the sequence of bar and space widths, resulting in a 4, 3, 2, 2, 1, 1, 2, 1 sequence for the FIG. 1 pattern. A different approach is to consider widths on the basis of edge to similar edge, which has been found more reliable in some circumstances. This approach provides a T-sequence based on pattern widths between similar edges (i.e., from the start of a bar to the start of the next bar and from the start of a space to the start of the next space). On this basis, the T-sequence for the FIG. 1 bar/space pattern is 7, 5, 4, 3, 2, 3, 3. The bar code coding is desirably arranged so that the T-sequence is unique for each four bar and four space pattern utilized.

A table such as shown in FIG. 2 could be used to decode a bar/space pattern. However, a code such as the packet code referred to above utilizes different bar/space patterns providing 1024 different T-sequences to represent a like number of decoded values (e.g., decoded values 0 through 1023). A decoder using the FIG. 2 table would thus have to make comparisons for up to 1024 table positions in order to either find a match identifying the decoded value or a particular T-sequence or determine that the particular T-sequence is not valid because of an error, etc. As a way to diminish the time and processing that would be required with a simple matching approach, a "Hashing function" has been used as a device to simplify bar code decoding A Hashing function is a mathematical relationship that is used to combine all of components of a T-sequence with relative weightings to provide, as an output, a single number of one or more digits. The mathematical relationship may typically be determined on a trial and error basis, with the goal of choosing a relationship having the characteristic of converting each T-sequence into a unique output number. The results of use of such a Hashing function are illustrated in FIG. 3. Thus, with reference to the first row in FIG. 3, assume that the T-sequence shown, when each integer is multiplied by a particular weighting factor, the results added, and the aggregate divided by a constant (as provided by a hypothetical Hashing function) provides an output number "1" shown in the first column. The FIG. 3 table then cross-references the output number 1 to the first decoded value "0", shown in the last column.

Thus, a specific T-sequence is processed by use of the Hashing function to provide the output number 1 and the T-sequence shown in the adjoining column of the first row is then compared to the specific T-sequence. If the T-sequence that generated the output number is the same as the T-sequence from the table, the corresponding decoded value (0 in this example) is identified as the decoded value of the T-sequence. In this case, a unique decoded value for a specific bar/space pattern is identified by a unique output number arrived at by use of the Hashing function to process the T-sequence of the bar/space pattern.

However, as a practical matter, a Hashing function may typically provide a unique output number for only about 80 percent of the unique bar/space patterns of a bar code coding set. For the remaining cases the same output number is duplicated for two or more different T-sequences, when processed by the Hashing function. The table of FIG. 3 provides the function of a Hashing table to enable identification of the decoded value actually intended to correspond to each one of the two or more T-sequences which provide the same output number. Briefly, if the output number in the first column is derived from a T-sequence which does not match the T-sequence immediately to the right of the output number a match is not made and instead the pointer column value in that row identifies a different row to be used for a matching attempt. Thus, in the row wherein the number in the first column is the output number "5", the pointer column identifies row 3. If the particular T-sequence resulting in the output number 5 is not identical to the T-sequence included in the second column of this row, then that particular T-sequence is compared to the T-sequence at column 2 of row 3. If the T-sequence is identical, the proper decoded value of the T-sequence is "2", if not the T-sequence is compared for identity with the T-sequence shown at column 2 of row 2027 as identified in the pointer column. If identical, the output value for this particular T-sequence (and its bar/space pattern) is "1021", if again a match is not found, then the T-sequence is invalid. Invalidity can result from errors in reading the bar code, from damage to the bar code, from faulty printing of the bar code, etc. In this example the conclusion as to invalidity is reached because it is predetermined that only three valid T-sequences result in a Hashing function output number of "5" and only the corresponding number of relevant pointers is provided. While not actually shown in FIG. 3, it will be understood that a different T-sequence is entered in the second column in each row of the FIG. 3 table.

It can thus be appreciated that the Hashing function approach, while more efficient than a straight comparison approach, still requires a significant level of processing activity and time in order to identify decoded values.

As a separate consideration, in prior bar code decoding arrangements (as embodied in bar code reader units) the decoded values of bar/space patterns are typically directly converted into alphanumeric characters, for example, which are representative of the original information decoded into the bar code. Thus, the decoded value of bar/space pattern may be "15" and this may correspond to the letter "C", for example. On a basis which is predetermined and physically or by programming built into the bar code decoder, the bar/space pattern resulting in the decoded value "15" always results in a decoder output signal representative of the letter "C". If, for a particular application, it should later be desired to provide decoder output signals representative of Russian, Chinese or Greek characters, or words, phrases or symbols, for example, there is typically no way to change from an Arabic character set to a different output character set, absent a significant level of modification of the bar code reader.

Objects of the present invention, therefore, are to provide dataform decoding methods characterized by one or more of the following:

dynamic replaceability of output data character sets without decoder modification;

selection between two or more different output data character sets as available in a dataform reader;

loading of output data character sets into a dataform reader by reading such character sets from dataforms; and replacement or supplementation of output data character sets based upon instructions encoded in a dataform readable by a dataform reader.

SUMMARY OF THE INVENTION

In accordance with the invention, a method of decoding a dataform such as a 2-D bar code in a bar code reader, comprises the following steps:

(a) loading into the dataform reader, prior to step (e), a loadable correlation listing correlating decoded values of bar/space patterns to corresponding data characters:

(b) reading a plurality of bar/space patterns of the 2-D bar code;

(c) utilizing the results of step (b) to provide a decoded value for one bar/space pattern;

(d) repeating step (c) for other bar/space patterns of the bar code to provide decoded values thereof; and (e) utilizing the correlation listing to correlate each of a plurality of decoded values as provided in steps (c) and (d) to a corresponding data character.

Also in accordance with the invention, step (a) above may comprise loading one or more loadable correlation listings by reading a 2-D bar code containing such listings in encoded form. A default correlation listing may be loaded into a dataform reader at the time of manufacture, for use in the absence of instruction to use a different correlation listing. Thereafter, one or more loadable correlation listings may additionally be loaded into the same dataform reader. Upon operation of the dataform reader to read a 2-D bar code, for example, one of the correlation listings available in the dataform reader may be selected to correlate each bar/space pattern of the bar code to a corresponding data character. Information decoded from the bar code can be used to control the choice of which one of a plurality of available correlation listings is to be employed to process a particular bar code. In this way, the bar/space patterns of one bar code can be correlated to a first set of output data characters and the bar/space patterns of a bar code subsequently read by the same dataform reader can be correlated to a different set of output data characters. The invention is applicable to other types of dataforms, such as matrix codes, etc., wherein the "bars" of bar/space patterns may actually resemble squares or other shapes.

BRIEF DESCRIPTION OF THE DRAWINGS

FIG. 7 is a table useful in describing default and loadable correlation listings provided in accordance with the invention.

DESCRIPTION OF THE INVENTION

Figure 4:
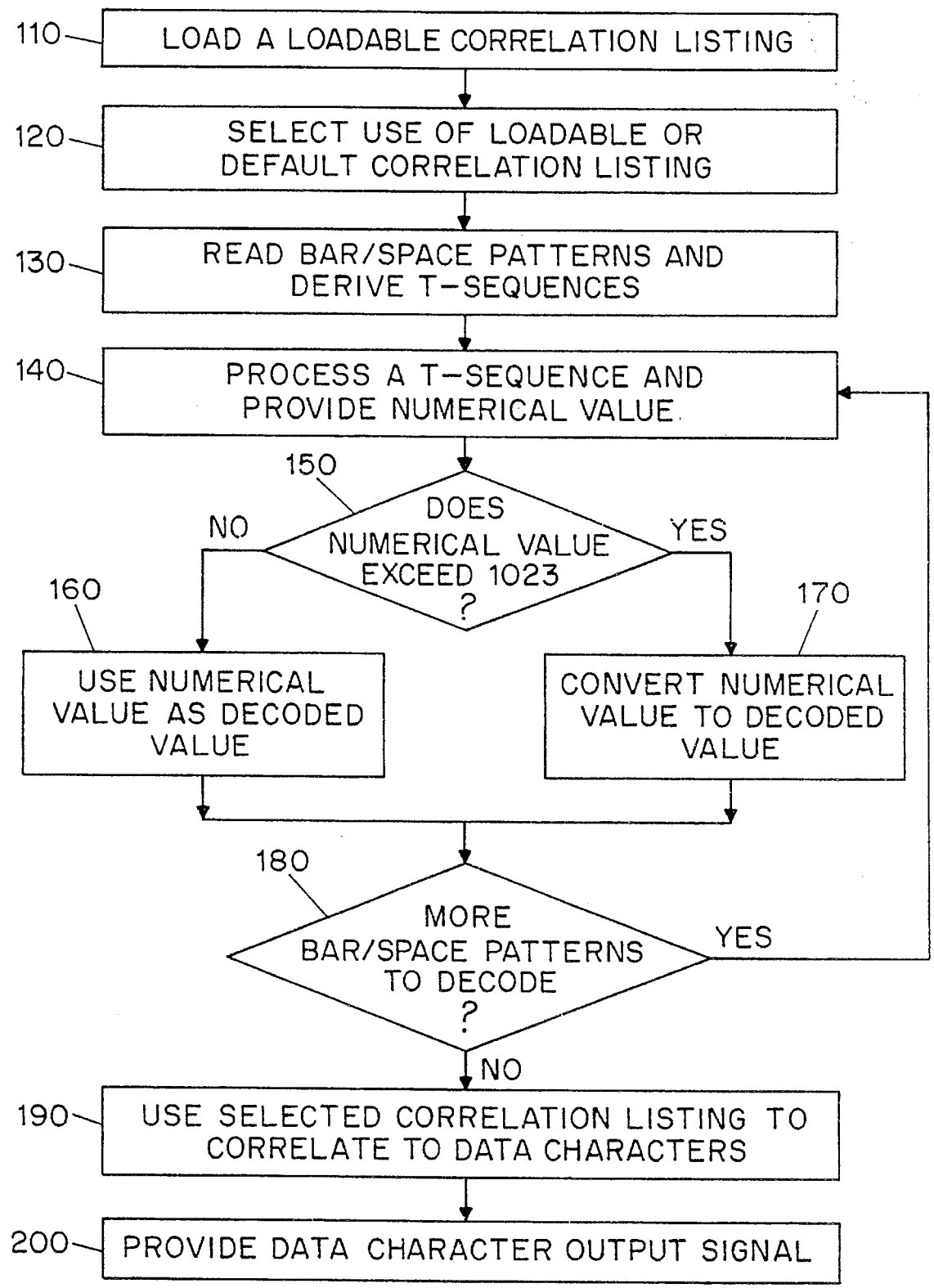
FIG. 4 is a flow chart useful in describing a method of decoding a 2-D bar code in accordance with the invention.
Figures 5, 6:
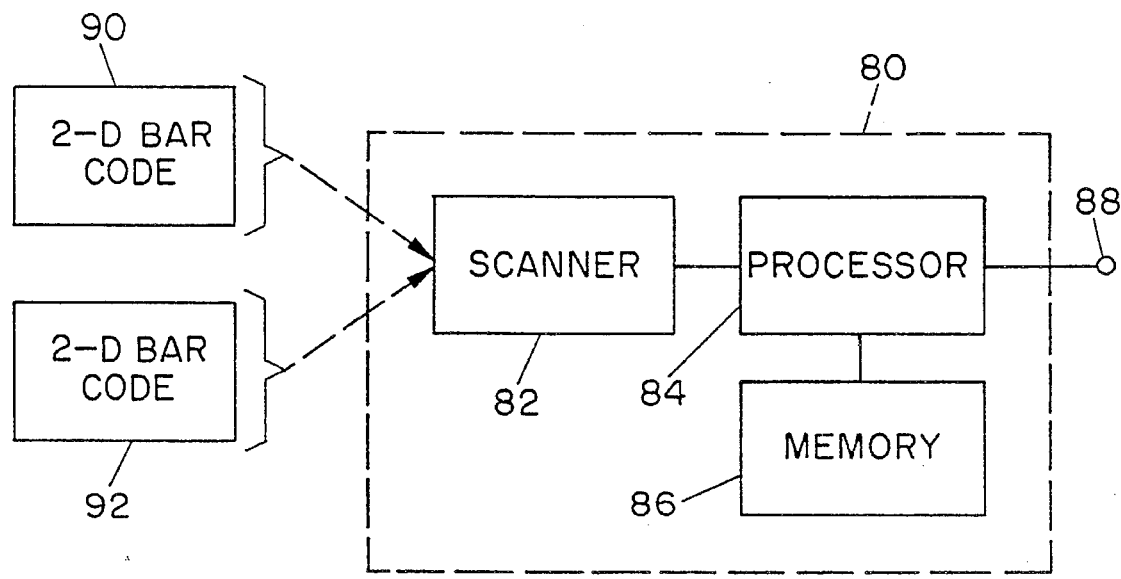
FIG. 5 is a simplified block diagram of a bar code reader arranged for use with the invention.
FIG. 6 is a cross-referencing table useful in describing methods in accordance with the invention.

FIG. 4 is a flow chart useful in describing a method of decoding a 2-D bar code in accordance with the invention. At step 110 a loadable correlation listing, which correlates decoded values of bar/space patterns of a bar code to corresponding data characters represented by such bar/space patterns, is loaded into a bar code reader. FIG. 5 is a simplified block diagram of a bar code reader 80, which includes a scanner portion 82, a processor portion 84, a memory unit 86 and an output port 88 for making available signals representative of data characters. Scanner portion 82 may comprise any suitable arrangement for providing signals representative of the bar/space patterns of a bar code, such as a laser scanner or other available device. Processor portion 84 is typically a microprocessor or other suitable device arranged to implement processing of the bar/space representative signals using known bar code signal processing and decoding techniques which are supplemented or replaced as appropriate to implement the present invention as will be described. Persons working in the field are highly skilled in implementation of bar code reading and decoding and, once having an understanding of the invention, will be capable of physical implementation thereof in forms suitable for various applications. Data character signals, representative of information encoded into the bar/space patterns of a bar code, can be made available at output port 88 for coupling to a printer, further processing within a bar code reader, transmission by wire, facsimile or computer interconnection network, etc.

Processor 84 is desirably provided with an available default correlation listing which may be stored in memory unit 86. As previously discussed in the context of existing systems, after the reading of a bar/space pattern corresponding sequence data is developed and processed to provide a numerical value which is then converted to a unique decoded value. In a typical decoder, the decoded values may take the form of a set of alphanumeric characters including numerals 0 through 9, letters A through Z, and a number of additional characters. Although the present methods are different than methods previously used, a default correlation listing may be arranged for correlating decoded bar/space pattern values to a similar alphanumeric data character set. This permits the FIG. 5 bar code reader to scan a bar code 92 encoded with letters and numbers (e.g., "ABC123") and provide signals representative of the encoded letters and numbers at output port 88.

Referring again to step 110, pursuant to the present invention, a loadable correlation listing is loaded into a bar code reader. As a result, there will be available within the bar code reader both a default correlation listing (e.g., correlating decoded bar/space patterns to alphanumeric characters) and a loadable correlation listing. Depending upon the particular application, the loadable correlation listing may be configured to correlate decoded bar/space patterns to Russian, Chinese or Greek characters, to English words or phrases, to numerical symbols, to diagrammatic symbols or to other types of characters. As used herein, the phrase "data character" is defined as encompassing a full range of letters, numbers, words and other data, text and symbol items as may be desired to communicate. It will thus be appreciated that in the encoding process a given bar/space pattern representative of the word "electron", for example, can be included in a bar code. Then, during decoding, by use of a loadable correlation listing which correlates the given bar/space pattern, as read, with the character "electron", the output signal provided by the bar code reader will be representative of, and discernable in further processing, as the word "electron". A variety of arrangements for loading a loadable correlation list into a bar code reader are available in the prior art. In application of the invention, a currently preferred loading method comprises encoding the loadable correlating list into a bar code, with appropriate identification and application instructions also encoded into the bar code. The bar code reader is enabled to read and decode this bar code and the processor unit is arranged to recognize and store the loadable correlation listing for future use. Such loading may make use of the default correlation listing already available within the memory unit.

The bar code reader may be arranged to automatically utilize a loadable correlation listing, when one is available, or may be arranged to permit user selection between the loadable and default correlation listings. It will also be appreciated that a loadable correlation listing may be configured to provide data characters corresponding to only some of the full complement of usable bar/space patterns, so that the default correlation listing will be used for the remaining patterns. For example, a loadable correlation listing might include foreign language characters correlated to the bar/space patterns used for the alphabetic portion of the default correlation listing, but no characters correlated to the bar/space patterns used for the numerical portion of the default correlation listing. The default correlation listing would thus continue to be used for numerical characters, even though a loadable correlation listing was available for use for language characters, in this example.

At step 120, a selection is made between a loadable correlation listing loaded in step 110 and a default correlation listing available in the bar code reader. As noted, the bar code reader may automatically utilize a loadable correlation listing, if available in the reader, or provision may be made for user selection. At step 130, the bar code reader is activated to read a plurality of bar/space patterns of a bar code to be decoded and derive corresponding sequence data (e.g., T-sequences as previously described).

Figures 1, 2, 3:
FIG. 1 shows a bar/space pattern which may be one of many similar patterns included in a 2-D bar code.
FIG. 2 is a table cross-referencing T-sequences to decoded values of bar/space patterns.
FIG. 3 is a table cross-referencing prior art Hashing function values of T-sequences to corresponding T-sequences, to pointer information for resolving duplicate Hashing function values, and to decoded values of bar/space patterns represented by the T-sequences.

At step 140 the sequence data for a bar/space pattern is processed to provide a numerical value representative thereof. In accordance with the invention, however, instead of the Hashing function approach previously used, a different form of processing of T-sequence data is used. As noted above, Hashing functions are derived to meet the objective of converting as many unique T-sequences as possible into unique output numbers, in order to minimize the number of T-sequences which are converted into duplicate output numbers. Thus, the prior objective was to avoid the additional processing necessary to resolve ambiguities where different T-sequences result in the same output number. In the prior use of Hashing functions, the output number of the Hashing function for each T-sequence was then converted into a decoded value as shown in the right-hand column of the FIG. 3 table. In contrast, in application of the present invention a processing function is derived to provide the characteristic of processing T-sequence data to derive representative numerical values with no duplicate numerical values at or below a predetermined number (eog., no numerical value ambiguities at or below the number 1023 for the packet bar code discussed above). The source code for application of an appropriate processing function for decoding in accordance with the invention is provided below under the heading "PROCESSING FUNCTION". Results of decoding with use of this processing function are illustrated in FIG. 6. FIG. 6 illustrates a table cross-referencing between (a) numerical values shown in the first column, which are provided by use of the processing function to process bar/space pattern T-sequence data, and (b) correlating decoded values of the bar/space patterns, as represented in the second column. As indicated, for numerical values not exceeding the predetermined number 1023, the numerical value is simply used as the decoded value, so that actually no cross-referencing or conversion is required. The need for additional prior art processing to go from a Hashing function output number in the first column of FIG. 3 to a decoded value in the last column of FIG. 3 is thus avoided.

With reference to FIG. 6 it will be appreciated that the present processing function is not effective to process every T-sequence directly into a final decoded value, so that no T-sequence will be converted directly into a decoded value of 1022, for example. The processing function utilized in the source code as listed is, however, effective to process the 1024 unique T-sequences for the packet bar code to provide 999 numerical values directly usable as decoded values in the range from 0 through 1023, as represented in the upper "A" portion of the FIG. 6 table. This leaves only 25 T-sequence numerical values which exceed the predetermined number of 1023. As indicated in the lower "B" portion of the FIG. 6 table, these 25 T-sequences as processed by use of the processing function provide a range of numerical values exceeding the predetermined maximum number 1023 and which must therefore be converted to a corresponding number which is one of the decoded values missing in the A portion of the table (e.g., decoded value 1022, for example). The FIG. 6 table is provided by way of example and may not correspond to the specific results obtained by use of the listed processing function source code which is effective to directly process 999 of the 1024 unique T-sequences into the appropriate decoded values.

Referring to FIG. 4, at step 150 the method proceeds as already described. If the numerical value provided by processing a T-sequence does not exceed the predetermined number 1023, in this example, at step 160 the numerical value is utilized as the decoded value of the bar/space pattern. At step 170, if the numerical value exceeds the predetermined number 1023 it is converted to a corresponding number (e.g., one of the missing numbers in portion A of FIG. 6) and that corresponding number is utilized as the decoded value of the bar/space pattern.

At step 180, if additional bar/space patterns remain to be decoded steps 140 through 170 are repeated to provide the decoded values for each of such additional patterns.

At step 190, a correlation listing is utilized to correlate each decoded value to a corresponding data character. As discussed, a bar code reader may have available both a default correlation listing and a loadable correlation listing. The default correlation listing may desirably be stored in the bar code reader memory before the reader leaves the factory. In accordance with a currently preferred embodiment, a loadable correlation listing may be entered in the field or elsewhere by use of an appropriately encoded 2-D bar code to provide a data character set more efficiently adapted to a particular use or type of application of a specific bar code reader. As represented in FIG. 7, decoded values of the 1024 unique bar/space patterns are listed in column A and corresponding data characters of a default correlation listing are listed in column B. Upon loading of a loadable correlation listing, an example of which is shown in column C, the bar code reader is enabled to respond directly to appropriately encoded 2-D bar codes to provide output signals representative of data characters such as Greek letters and whole words, for example. As shown, column C includes no data characters in the initial rows, so that the default numerical data characters 0, 1, 2, 3, etc. would be utilized. Alternatively, the loadable correlation listing in column C may replicate the 0, 1, 2, 3 characters or substitute other characters. As noted, the bar code reader may be configured to automatically utilize the characters of a loadable correlation listing, when present, or the selection between default and loadable correlation listing may be user determinable.

At step 200, a decoded bar code signal representative of data characters is provided (at output port 88 in FIG. 5, for example) for printout, transmission or other use. By appropriate provision of a loadable correlation listing of data characters directly usable by a computer arranged to perform specialized data processing, complex or specialized data may be very efficiently communicated to such computer. The present invention provides flexibility to address specialized applications by enabling customized data character sets to be dynamically loaded in the field. With reference to FIG. 5, bar code scanner 80 can thus be utilized to read a bar code 90 encoded to utilize a standard form of alphanumeric data character set via a default correlation listing available on a standard basis within the bar code reader. Bar code 90 may comprise encoded alphanumeric data intended for normal decoding for further use, or may comprise a loadable correlation listing, with appropriate identification and instructions, to be read by the reader and stored for use. In the latter case, bar code 92 may comprise data encoded consistent with a customized data character set represented by the loadable correlation listing. The invention thus provides increased capabilities and efficiencies by use of data character sets which can be designed to include characters in the form of symbols, mathematical relationships, words, phrases, etc., selected for particular applications, and which can be dynamically loaded into the bar code reader without necessitating factory-installed modifications.

The invention as described is applicable for use with a variety of forms of 2-D bar codes, including the packet bar code referred to above. The packet bar code as described in the referenced pending application utilizes individual packets each including two bar/space patterns. Each bar/space pattern may be of the type shown in FIG. 1, with one bar/space pattern representing a data portion and the other representing instructions (such as the address of the data portion in a sequence of data) relating to the data portion. In the context of decoding a packet bar code steps 130 through 180 of FIG. 4 are typically performed for each instruction bar/space pattern independently in parallel or series with processing of the data bar/space patterns representative of data characters in the manner previously described with reference to FIG. 4. Thus, while the bar/space patterns representing data are then correlated to data characters in accordance with the present invention, the instruction bar/space patterns provide information used to carry out the positioning of the data bar/code patterns or for other purposes. In a packet bar code application, for example, the initial packets will typically include information and instructions regarding the bar code parameters (such as the total number of packets and error correction protocol) and may also include information regarding the particular correlation listing to be used in step 190.

In application of the invention, it will thus be understood that steps 110 and 120 of the FIG. 4 flow chart can actually be implemented at any point before step 190. For example, assume a particular user of a bar code reader is preparing to perform a series of bar code readings as part of an inventory of a store of items each bearing a 2-D bar code. The user may simply set the reader at step 120 to select a loadable correlation listing, previously loaded. The correlation listing as thus selected may include data characters customized to provide instructions as to how data on each type of inventory item is to be entered into an inventory data base. Alternatively, as noted with reference to the packet bar code, the bar code itself may include instructions as to the choice of one of several previously stored loadable correlation listings, which will be implemented without requiring any action by the user. Thus, step 110 must be performed before step 120 (unless no loadable correlation listing is to be provided, so that at step 120 the bar code reader merely selects the default correlations listing). However, step 120 can be arranged to be implemented at any time prior to step 190.

With an understanding of the invention, many variations and combinations, which may involve other known steps (such as storage of decoded values prior to correlation to data characters) will become apparent to skilled persons in different applications. For example, in the method illustrated in FIG. 4 processing of additional T-sequences to provide decoded values, in steps 140–170, may be carried out in series as indicated, or one or more of the T-sequences may be processed in parallel.

```
/*Metanetics Corporation (C) 1994*/
/*SuperCode tseq decoder: t_decode*/
/*return value [0..1023] for valid codeword
   return value -1 for invalid codeword.
   odd parity check required before calling this routine.*/
int t_table[26] = {
    22,115,140,148,179,188,198,206,226,388,
    395,469,562,573,707,708,755,805,824,876,
    885,920,951,-1,971,978};
int t_decode(char* t)
{
/*map the t-seq into 0..1023*/
{int i,value;
    value = t[0];
    for(i=1;i<6;i++){
        value = value << 3;
        value += t[i];
        if(value >= 1069){ value %= 1069;}
    }
    if(value >= 1024){
        if(value < 1050)
            value = t_table[value - 1024];
        else value = -1;
    }
    return value;
    }
}
```

© Metanetics Corp. 1994

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of decoding a 2-D bar code in a bar code reader, comprising the steps of:
    (a) loading into said bar code reader, prior to step (e), a loadable correlation listing correlating decoded values of bar/space patterns to corresponding data characters;
    (b) reading a plurality of bar/space patterns of said 2-D bar code;
    (c) utilizing the results of step (b) to provide a decoded value for one said bar/space pattern;
    (d) repeating step (c) for other bar/space patterns of said bar code to provide decoded values thereof; and
    (e) utilizing said correlation listing to correlate each of a plurality of said decoded values as provided in steps (c) and (d) to a corresponding data character.

2. A method as in claim 1, wherein step (e) comprises:
    (e) selectively utilizing one of said loadable correlation listing and a default correlation listing available in said bar code reader, to correlate each of a plurality of said decoded values as provided in steps (c) and (d) to a corresponding data character.

3. A method as in claim 1, wherein step (a) comprises loading said loadable correlation listing by reading a 2-D bar code containing said loadable correlation listing in encoded form.

4. A method as in claim 1, wherein step (a) comprises loading a plurality of said loadable correlation listings and step (e) comprises:
    (e) selectively utilizing one of said loadable correlation listings to correlate each of a plurality of said decoded values as provided in steps (c) and (d) to a corresponding data character.

5. A method as in claim 4, wherein step (a) comprises loading said loadable correlation listings by reading a 2-D bar code containing said loadable correlation listings in encoded form.

6. A method as in claim 1, wherein said bar code comprises data bar/space patterns representative of data characters and instruction bar/space patterns representative of information relating to said data bar/space patterns, and step (e) is performed only with respect to a plurality of decoded values provided from said data bar/space patterns.

7. A method as in claim 6, additionally including the following step between steps (d) and (e):
    (x) utilizing decoded values of said instruction bar/space patterns to provide information used to control the processing of said data bar/space patterns in said bar code reader.

8. A method of decoding a 2-D dataform in a dataform reader, comprising the steps of:
    (a) reading a 2-D dataform containing a loadable correlation listing to load into said dataform reader, prior to step (c), a loadable correlation listing correlating bar/space patterns to corresponding data characters;
    (b) reading a plurality of bar/space patterns of said 2-D dataform; and
    (c) utilizing the results of step (b) and said correlation listing to correlate each of a plurality of said bar/space patterns to a corresponding data character.

9. A method as in claim 8, wherein step (c) comprises:
    (c) utilizing the results of step (b) and a selected one of said loadable correlation listing and a default correlation listing available in said dataform reader, to correlate each of a plurality of said bar/space patterns to a corresponding data character.

10. A method as in claim 8, wherein said dataform comprises data bar/space patterns representative of data characters and instruction bar/space patterns representative of information relating to said data bar/space patterns, and step (c) is performed only with respect to a plurality of decoded values provided from said data bar/space patterns.

11. A method of decoding a 2-D dataform in a dataform reader, comprising the steps of:
    (a) loading into said dataform reader, prior to step (c), a plurality of correlation listings, each correlating bar/space patterns to corresponding data characters;
    (b) reading a plurality of bar/space patterns of said 2-D dataform; and
    (c) utilizing the results of step (b) and a selected one of said correlation listings to correlate each of a plurality of said bar/space patterns to a corresponding data character.

12. A method as in claim 11, wherein step (a) comprises loading at least one of said correlation listings as a loadable correlation listing by reading a 2-D dataform containing said loadable correlation listing in encoded form.

13. A method as in claim 11, wherein step (a) comprises providing one of said correlation listings as a loadable correlation listing and one of said correlation listings as a default correlation listing stored in said dataform reader.

14. A method as in claim 13, wherein step (a) comprises loading said loadable correlation listing by reading a 2-D dataform containing said loadable correlation listing in encoded form.

15. A method as in claim 11, wherein said 2-D dataform comprises data bar/space patterns representative of data characters and instruction bar/space patterns representative of information relating to said data bar/space patterns, and step (c) is performed only with respect to a plurality of decoded values provided from said data bar/space patterns.

\* \* \* \* \*